US012782219B2

(12) United States Patent
Maes et al.

(10) Patent No.: US 12,782,219 B2
(45) Date of Patent: Nov. 3, 2026

(54) PRESSURE SENSOR RESISTOR CONFIGURATION FOR STRESS COMPENSATION

(71) Applicant: Melexis Technologies NV, Tessenderlo (BE)

(72) Inventors: Ben Maes, Tessenderlo (BE); Appo Van Der Wiel, Tessenderlo (BE); Johan Vergauwen, Tessenderlo (BE)

(73) Assignee: Melexis Technologies NV, Tessenderlo (BE)

( * ) Notice: Subject to any disclaimer, the term of this patent is extended or adjusted under 35 U.S.C. 154(b) by 317 days.

(21) Appl. No.: 18/587,396

(22) Filed: Feb. 26, 2024

(65) Prior Publication Data

US 2024/0288325 A1 Aug. 29, 2024

(30) Foreign Application Priority Data

Feb. 27, 2023 (EP) .................................... 23158904

(51) Int. Cl.
*G01L 9/00* (2006.01)
*G01L 9/06* (2006.01)
(Continued)

(52) U.S. Cl.
CPC ............ *G01L 9/0054* (2013.01); *G01L 9/065* (2013.01); *G01L 9/08* (2013.01); *G01L 27/005* (2013.01)

(58) Field of Classification Search
CPC ......... G01L 9/0054; G01L 9/065; G01L 9/08; G01L 27/005; G01L 19/0092; G01L 19/04; G01L 1/16
See application file for complete search history.

(56) References Cited

U.S. PATENT DOCUMENTS 6,700,473 B2 * 3/2004 Kurtz .................... G01L 9/0055 338/42
9,689,767 B2 * 6/2017 Van Der Wiel ......... G01L 19/04
(Continued)

FOREIGN PATENT DOCUMENTS

CN 105829849 A 8/2016
CN 107003198 A 8/2017
(Continued)

OTHER PUBLICATIONS

Extended European Search Report from corresponding EP Application No. 23158904.5, Jun. 21, 2023.
(Continued)

*Primary Examiner* — Freddie Kirkland, III
(74) *Attorney, Agent, or Firm* — Workman Nydegger

(57) ABSTRACT

A semiconductor pressure sensor comprising a membrane, delineated by an edge, and a group of neighboring piezo resistors: a first pair of piezo resistors near the edge of the membrane (a first piezo resistor $R_{Tmemb}$, a second piezo resistor $R_{Lmemb}$); a second pair of piezo resistors (a third piezo resistor $R_{Tref}$, a fourth piezo resistor $R_{Lref}$) at a position where applied pressure causes reduced surface stress compared to surface stress at the position of the first and the second piezo resistor. A signal from the first piezo resistor and a signal from the second piezo resistor, corrected with a signal from the third piezo resistor and a signal from the fourth piezo resistor, are used as a measure of a pressure on the membrane.

6 Claims, 6 Drawing Sheets

(51) Int. Cl.
*G01L 9/08* (2006.01)
*G01L 27/00* (2006.01)

(56) References Cited

U.S. PATENT DOCUMENTS

| | | | |
|---|---|---|---|
| 10,260,981 B2 | 4/2019 | Holm et al. | |
| 10,317,297 B2 * | 6/2019 | Van Der Wiel | G01L 9/0055 |
| 2016/0265999 A1 * | 9/2016 | Van Der Wiel | G01L 19/04 |
| 2018/0172533 A1 | 6/2018 | Liu | |
| 2025/0076140 A1 * | 3/2025 | Maes | G01L 9/065 |

FOREIGN PATENT DOCUMENTS

| | | | |
|---|---|---|---|
| CN | 108469317 | A | 8/2018 |
| EP | 0083496 | A2 | 12/1982 |
| EP | 3032235 | A1 | 6/2016 |
| GB | 2521163 | A | 6/2015 |
| JP | 2017181434 | A | 10/2017 |

OTHER PUBLICATIONS

Chinese Office Action from Corresponding Chinese Patent Application No. CN202410209018.6, Feb. 24, 2026.

* cited by examiner

PRESSURE SENSOR RESISTOR CONFIGURATION FOR STRESS COMPENSATION

FIELD OF THE INVENTION

The invention relates to the field of pressure sensors. More specifically it relates to a pressure sensor comprising piezo-resistors mounted on a membrane.

BACKGROUND OF THE INVENTION

In general, a pressure sensor provides an output signal by means of piezo resistors that are configured together in a certain configuration, often configured as a Wheatstone bridge. The piezo resistors are placed on the edge of a membrane in a transversal and longitudinal direction with respect to the membrane stress that is proportional to the applied pressure. When a differential pressure is applied to the membrane, the membrane will bend and will create a stress on the edges of the membrane. This stress will change the resistance of the piezo resistors near these edges and therefore the output voltage will change depending on the stress. In summary: a differential pressure between the top and bottom side of the membrane will create an output voltage on the Wheatstone bridge that is an indication of the applied differential pressure.

It becomes problematic when the piezo resistors are changing due to a different source than the differential pressure. E.g. an external stress or a temperature gradient. A change of the piezo resistors due to a different source than the differential pressure might influence the sensor output and give an undesired signal.

When the piezo resistors are placed in a Wheatstone bridge configuration, it is robust against sources that influence certain combinations of piezo resistors. When the differential output of the Wheatstone bridge does not change, there is no undesired signal (ignoring some secondary effects like self-heating of the piezo resistors and common mode voltage influence on the amplifier).

FIG. 1 shows a prior art layout of piezo-resistors R1, R2, R3 and R4 on a membrane. FIG. 2 shows an electronic circuit wherein piezo-resistors R1, R2, R3 and R4 are arranged in a Wheatstone bridge layout. A supply voltage Vbridge is applied to the node between R1 and R3 and ground is connected to the node between R2 and R4. The output voltage is measured between the node (voltage Vinm) between R1 and R2, and the node (Vinp) between R3 and R4.

A first example that shows the robustness of the Wheatstone bridge is when all the resistors R1, R2, R3, R4 change with the same percentage. In that case the outputs Vinm and Vinp don't change. This example shows how the common mode influence of e.g. temperature on the piezo resistors can be compensated.

A second example is when all the resistors in one leg of the Wheatstone bridge change with the same percentage. Also in this case the outputs Vinm and Vinp don't change. However, this is less ideal because the current through the different legs of the Wheatstone bridge is different which might be a cause for some imbalance (e.g. different self-heating of the resistors which might give them a different sensitivity).

A third example is when the 2 piezo resistors connected to the same supply voltage change with the same percentage. This will change the single ended outputs in exactly the same way so that the differential output does not change.

However, this is also not ideal since the common mode output does change and might have an influence on the amplification of the amplifier.

In a fourth example there are two pairs of piezo resistors. Each pair changes with the same percentage but the pairs change with different percentages. The piezoresistor pairs (R1, R3) may change with a same first percentage and the piezoresistor pairs (R2, R4) may change a same second percentage. In another case the piezoresistor pairs (R1, R2) may change a same first percentage and (R3, R4) may change a same second percentage. The differential output is not changing and thus the Wheatstone bridge configuration is also robust for such a change, for instance a gradient of stress or temperature over the membrane with the Wheatstone bridge.

An undesired signal is created when there is a change in resistance of the piezo resistors due to a different source than the pressure which changes the differential output of the Wheatstone bridge. It is for example possible that a stress source creates an irregular stress gradient over the chip as indicated by the arrow in FIG. 1. This arrow represents a stress gradient. A stress source may for example be present at the beginning of the arrow resulting in high stress at the beginning of the arrow and low stress add the end of the arrow. This might, for example, result from package stress or due to metal stress on one side of the die. As a result, the piezo resistors don't see the same stress and the output signal will have an error. In this example the piezo resistors R2 sees much more stress from the stress source than the other 3 resistors and that changes the Wheatstone bridge output.

Another external influence could be that a temperature gradient or a local hotspot heats up one resistor in the bridge more than the other resistors. This would also create a wrong Wheatstone bridge output signal. In general resistors are placed at different sides and therefore placed relatively far away from each other.

Basically a symmetric Wheatstone bridge configuration laying over a certain area or membrane area compensates for linear stress gradients and linear temperature gradients over that area, but not for non-linear stress- or temperature gradients.

Conventional piezoresistor stress sensors are only capable of partially compensating external stress or temperature effects. They are typically not compensating the stress or temperature when the gradient is non-linear or when the stress or temperature change is very local.

There is therefore a need for semiconductor pressure sensors that can compensate for disturbances which change irregularly.

SUMMARY OF THE INVENTION

It is an object of embodiments of the present invention to provide a good semiconductor pressure sensor.

The above objective is accomplished by a method and device according to the present invention.

Embodiments of the present invention relate to a semiconductor pressure sensor comprising a membrane, delineated by an edge of the membrane, and a group of neighboring piezo resistors.

The group comprises a first pair of piezo resistors comprising a first piezo resistor and a second piezo resistor near the edge of the membrane, and positioned such that center points of the first pair of piezo resistors are located on the membrane.

The group comprises a second pair of piezo resistors, comprising a third piezo resistor and a fourth piezo resistor at a position where applied pressure causes reduced surface stress compared to surface stress at the position of the first and the second piezo resistor.

In embodiments of the present invention the first and the third piezo resistor are substantially orthogonal to the second and the fourth piezo resistor.

In embodiments of the present invention the semiconductor pressure sensor is configured such that a signal from the first piezo resistor and a signal from the second piezo resistor, corrected with a signal from the third piezo resistor and a signal from the fourth piezo resistor, are used as a measure of a pressure on the membrane.

In embodiments of the present invention the four piezo resistors form a point symmetric layout.

In embodiments of the present invention the first piezo resistor and the third piezo resistor are positioned symmetrically with respect to a mirror line parallel with the edge of the membrane, and the second piezo resistor and the fourth piezo resistor are positioned symmetrically with respect to a mirror line parallel with the edge of the membrane.

In embodiments of the present invention the piezo resistors form a Wheatstone bridge wherein a first supply node is formed by a connection between the first resistor and the second resistor, a second supply node is formed by a connection between the third resistor and the fourth resistor, a first output node is formed by a connection between the first resistor and the third resistor, and a second output node is formed by a connection between the second resistor and the fourth resistor.

In embodiments of the present invention a voltage difference between the first output node and the second output node is used as the measure of the pressure on the membrane.

In embodiments of the present invention the piezo resistors of the group of neighboring piezo resistors are connected to a common node.

In embodiments of the present invention the common node is connected to the substrate.

In embodiments of the present invention the semiconductor pressure sensor is configured for applying, per piezo resistor, a predefined current through the piezo resistors.

In embodiments of the present invention the predefined current is the same for each piezo resistor.

In embodiments of the present invention the currents through the piezo resistors may be controlled that the voltage across the piezo resistors is the same for all piezo resistors. Such embodiments may be configured such that the differences in current is used as a measure for pressure and the sum of the currents is used a measure for temperature.

In embodiments of the present invention the signals from the piezo resistors are voltages across the piezo resistors and the semiconductor pressure sensor is configured for obtaining the measure of the pressure on the membrane by calculating the voltage across the second piezo resistor minus the voltage across the first piezo resistor plus the voltage across the third piezo resistor minus the voltage across the fourth piezo resistor.

In embodiments of the present invention an average of the voltage across the third piezo resistor and the voltage across the fourth piezo resistor is used for obtaining the measure of temperature on the resistor combination.

In embodiments of the present invention the difference between voltages across two piezo resistors is obtained by measuring a differential voltage across the two resistors.

In embodiments of the present invention the semiconductor pressure sensor comprises a current source per piezo resistor and each current source is connected to a separate piezo resistor.

In embodiments of the present invention the semiconductor pressure sensor comprises a current source and the semiconductor pressure sensor is configured for switching the current source between at least some of the piezo resistors.

In embodiments of the present invention the semiconductor is configured for comparing the signal of the first piezo resistor with the signal from the second piezo resistor for determining correct functionality of the semiconductor pressure sensor.

Particular and preferred aspects of the invention are set out in the accompanying independent and dependent claims. Features from the dependent claims may be combined with features of the independent claims and with features of other dependent claims as appropriate and not merely as explicitly set out in the claims.

These and other aspects of the invention will be apparent from and elucidated with reference to the embodiment(s) described hereinafter.

Figure 1:
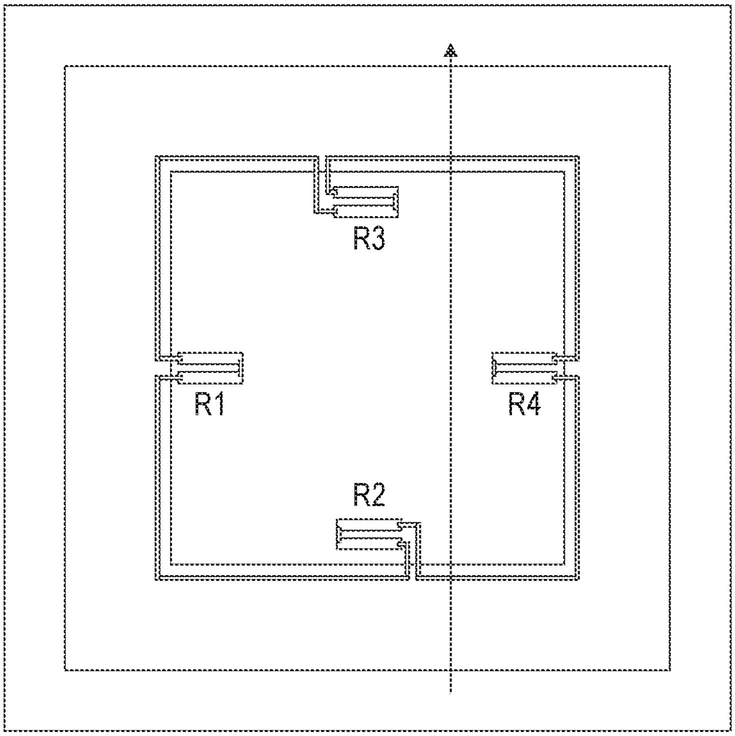
FIG. 1 (Prior Art)
FIG. 1 shows a prior art layout of piezo-resistors on a membrane.
Figure 2:
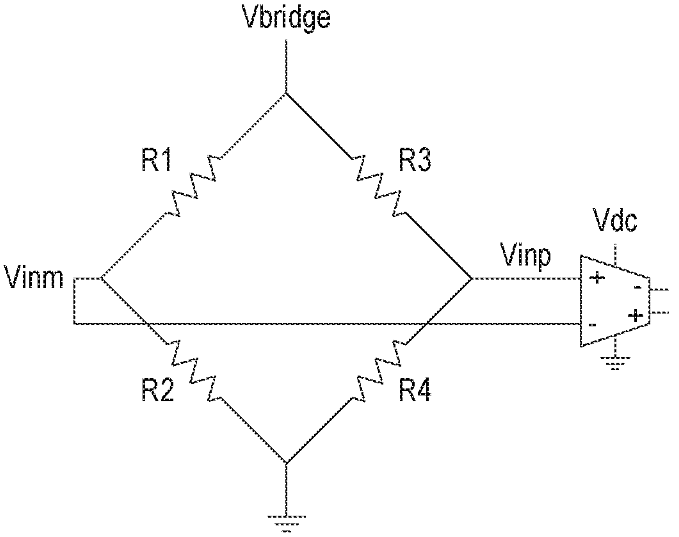
FIG. 2 (Prior Art)
FIG. 2 shows an electronic circuit wherein the piezo-resistors of FIG. 1 are arranged in a Wheatstone bridge layout.

Any reference signs in the claims shall not be construed as limiting the scope.

In the different drawings, the same reference signs refer to the same or analogous elements.

DETAILED DESCRIPTION OF ILLUSTRATIVE EMBODIMENTS

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not correspond to actual reductions to practice of the invention.

The terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising means A and B" should not be limited to devices consisting only of components A and B. It means that with respect to the present invention, the only relevant components of the device are A and B.

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may. Furthermore, the particular features, structures or characteristics may be combined in any suitable manner, as would be apparent to one of ordinary skill in the art from this disclosure, in one or more embodiments.

Similarly, it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

Where in embodiments of the present invention reference is made to a zero stress zone of the membrane, reference is made to a zone where the stress does not significantly change with differential pressure between the top and bottom side of the membrane. The piezo resistors which are positioned at least partially in the zero stress zone are not or less sensitive to the differential pressure compared to the piezo-resistors at the side of the membrane.

Where in embodiments of the present invention reference is made to a center point of a piezo resistor reference is made to the geometrical center of the piezo resistor. This is also the center of gravity of the 2-dimensional geometrical shape (the shape of the piezo-resistor in the substrate plane) of the piezo-resistor. In a center point any line through the center point divides the resistor in two equal resistive parts. The piezo-resistor may for example have a rectangular shape. In that case the center point is the center of gravity rectangular shape, and is located at the crossing of the diagonals of the rectangle.

A semiconductor pressure sensor 100 according to embodiments of the present invention is provided in a substrate.

The semiconductor pressure sensor comprises a membrane 110. In embodiments of the present invention the membrane 110 is obtained by making a cavity in the substrate. The membrane 110 is supported by a rim 120 at an edge of the membrane 110. The substrate may for example be a Silicon substrate.

The semiconductor pressure sensor 100, moreover, comprises a group of piezo resistors comprising a first, a second, a third, and a fourth piezo resistor. The first and the second piezo resistor are sensing piezo resistors which are sensitive to a differential pressure over the membrane. They are placed on a position on the membrane where stress is induced due to a differential pressure over the membrane. The third and fourth resistor are placed on a position where stress due to differential pressure is low or neglectable.

In embodiments of the present invention the first and the third piezo resistor $R_{Tmemb}$ and $R_{Tref}$ are substantially orthogonal to the second and the fourth piezo resistor $R_{Lmemb}$ and $R_{Lref}$.

In embodiments of the present invention the first piezo resistor $R_{Tmemb}$ is present at least partially on the membrane 110 at a side of the membrane 110 and parallel to the edge of the membrane.

In embodiments of the present invention the third piezo resistor $R_{Tref}$ is present at least partially outside the membrane 110 or at least partially on a zero stress zone of the membrane and parallel to the edge of the membrane.

In embodiments of the present invention the second piezo resistor $R_{Lmemb}$ is present at least partially on the membrane 110 at a side of the membrane 110 and perpendicular to the edge of the membrane.

In embodiments of the present invention the fourth piezo resistor $R_{Lref}$ is present at least partially outside the membrane 110 or at least partially on a zero stress zone of the membrane and perpendicular to the edge of the membrane.

The semiconductor pressure sensor 100 is configured such that a signal from the first piezo resistor $R_{Tmemb}$ and a signal from the second piezo resistor $R_{Lmemb}$, corrected with a signal from the third piezo resistor $R_{Tref}$ and a signal from the fourth piezo resistor $R_{Lref}$, are used as a measure of a pressure on the membrane.

The first and second piezo resistor form the first pair of piezo resistors. The third and fourth piezo resistor form the second pair of piezo resistors. In general, the third and fourth piezo resistor are at a position where applied pressure causes reduced surface stress compared to surface stress at the position of the first and the second piezo resistor.

It is an advantage of embodiments of the present invention that disturbances which change irregularly (e.g. non-linearly) over the semiconductor pressure sensor and result in a disturbance in the pressure measurement of the first ($R_{Tmemb}$) and the second ($R_{Lmemb}$) piezo-resistor can be compensated for by the third ($R_{Tref}$) and the fourth piezo-resistor ($R_{Lref}$). This is achieved by positioning the piezo-resistors as a group of neighboring piezo-resistors of which two are at least partially on the membrane and two are at least partially outside the membrane or at least partially on a zero stress zone of the membrane. The latter two are not or less sensitive to the pressure but are sensitive to the same disturbances as the piezo-resistors on the membrane which are sensitive to the pressure. The third and fourth piezo resistors may for example be positioned such that they are 50% less sensitive, or even 70% less sensitive, or even 90% less sensitive, or even 95% less sensitive for applied pressure than the first and second piezo resistors near the edge of the membrane.

The first pair of piezo resistors are substantially on the membrane. For example 90% of the piezo resistor surface area may be located on the membrane. Part of it may be located on the edge of the membrane as this edge may be subject to relatively high stress when a pressure difference is applied to the membrane.

When, in embodiments of the present invention, the third and the fourth piezo resistor are positioned substantially outside the membrane, for example at least 90% of the piezo resistor surface area may be located outside the membrane. When, in embodiments of the present invention, the third and fourth piezo resistors are outside the membrane edge, they may be located near the edge of the membrane for better matching with the first and second piezo resistor, but they may be located further away from the membrane edge than the first and second piezo resistor.

Thus, the semiconductor pressure sensor can be configured such that a signal from the first piezo resistor ($R_{Tmemb}$) and a signal from the second piezo resistor ($R_{Lmemb}$), are corrected with a signal from the third piezo resistor ($R_{Tref}$) and a signal from fourth piezo resistor ($R_{Lref}$), to obtain a pressure measurement with a reduced error from the disturbance. The first and third piezo resistor may be parallel with the membrane edge. The signal from the third piezo resistor can therefore be used for compensating the error in the signal of the first piezo resistor. The second and the fourth piezo resistor may be perpendicular to the membrane edge. The signal from the fourth piezo resistor may therefore be used for compensating the error in the signal of the second piezo resistor.

In embodiments of the present invention for each sensing resistor measuring the pressure ($R_{Tmemb}$, $R_{Lmemb}$), a compensating resistor ($R_{Tref}$, $R_{Lref}$) is present. The resistors are thereby be positioned such that stress and temperature are substantially the same for each sensing resistor and its compensating resistor. This is achieved by providing a group of neighboring piezo resistors. When the compensating resistors are partially or fully outside the membrane, the compensating resistors and the sensing resistors are on the same side compared to the center of the membrane. When the compensating resistors are on the zero stress zone, they are on that part of the zero stress zone which is closest to the sensing resistors.

In embodiments of the present invention the piezo resistors are forming a group of neighboring piezo resistors. The neighboring piezo resistors may for example be present in a section between two lines going through the center of the membrane and having an angle of 90° between them. In such embodiments the neighboring piezo resistors are present in a quarter of the membrane. In some embodiments the angle may be smaller than 90°, or even smaller than 80°, or even smaller than 70°, or even smaller than 60°, or even smaller than 50°, or even smaller than 40°.

In embodiments of the present invention a piezo resistor which is located near the edge of the membrane, may be located such that the distance between its center point and the edge of the membrane is less than 15%, or even less than 13%, or even less than 10%, or even less than 5% of the membrane size, wherein the membrane size is the maximum dimension of the membrane.

Figure 3:
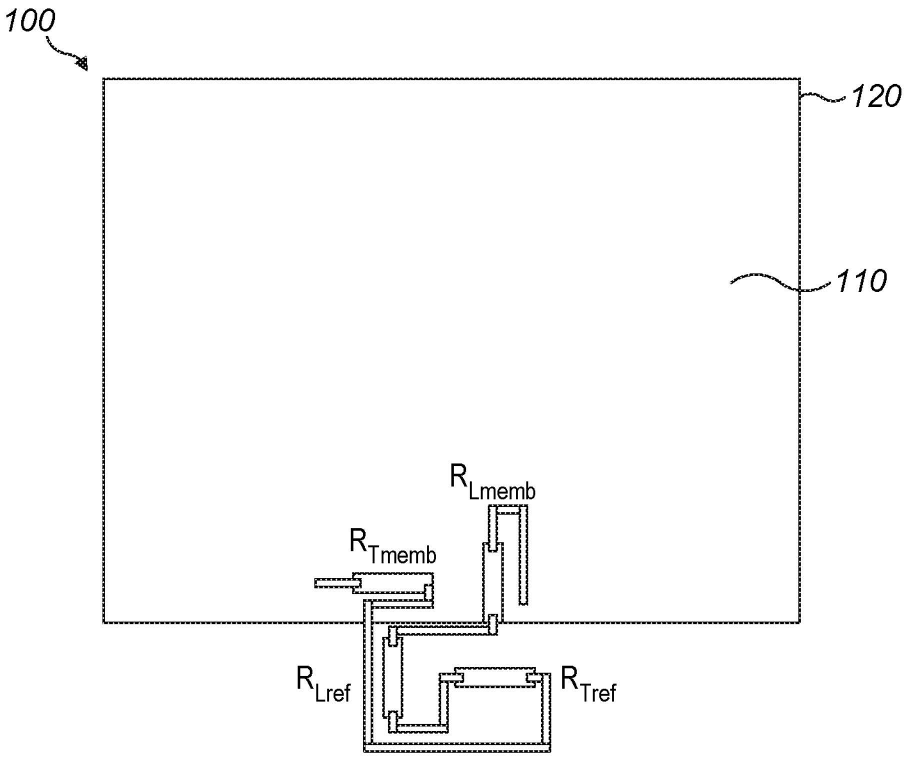
FIG. 3 shows a point symmetrical configuration of sensing piezo resistors on a membrane and compensating piezo resistors outside the membrane in accordance with embodiments of the present invention.

An example of a configuration where the second RTref and the fourth $R_{Lref}$ piezo resistor are at least partially outside the membrane is shown in FIG. 3. The first $R_{Tmemb}$ and second $R_{Lmemb}$ piezo resistor are present on the membrane at a side of the membrane. The four resistors form a group of neighboring piezo resistors.

In embodiments of the present invention the four piezo resistors form a point symmetric layout. It is an advantage of embodiments of the present invention that in such a configuration an optimized matching for temperature and stress gradients between the membrane and reference resistors is obtained.

In the layout shown in FIG. 3 the resistors are arranged around a symmetry point such that $R_{Lmemb}$ is point symmetric with respect to $R_{Lref}$ and $R_{Tmemb}$ is point symmetric with respect to $R_{Tref}$. When rotating around this symmetry point over 180° RLmemb would be rotated to the position of $R_{Lref}$ and $R_{Tmemb}$ would be rotated to the position of $R_{Tref}$. When rotating around this symmetry point over 90° RLmemb would be rotated to the position of $R_{Tref}$ and $R_{Tmemb}$ would be rotated to the position of $R_{Lmemb}$.

Figure 4:
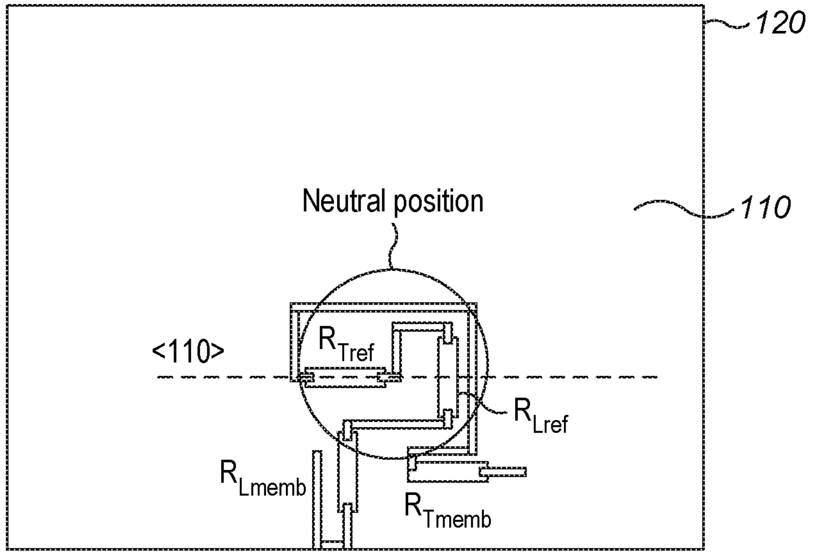
FIG. 4 shows a point symmetrical configuration of sensing piezo resistors on a membrane and compensating piezo resistors at least partially in a zero stress zone of the membrane in accordance with embodiments of the present invention.

An example of a configuration where the second piezo resistor $R_{Tref}$ and the fourth piezo resistor $R_{Lref}$ are at least partially on a zero stress zone of the membrane is illustrated in FIG. 4. Also in this exemplary embodiment of the present invention the four resistors form a point symmetric layout. Then, the output from the reference piezo resistors is dominated by the membrane stress that is not determined by applied pressure and the reference piezo resistors can be utilized to cancel the membrane stress signal component in the sensing bridge.

When the substrate has a (100) oriented silicon surface, the pressure sensitive resistors are preferably placed along the <110> directions for a p-type substrate and in the <100> directions for a n-type substrate. The reference resistors should have the same orientation as the pressure sensitive resistors to be able to compensate for package stress.

Figure 5:
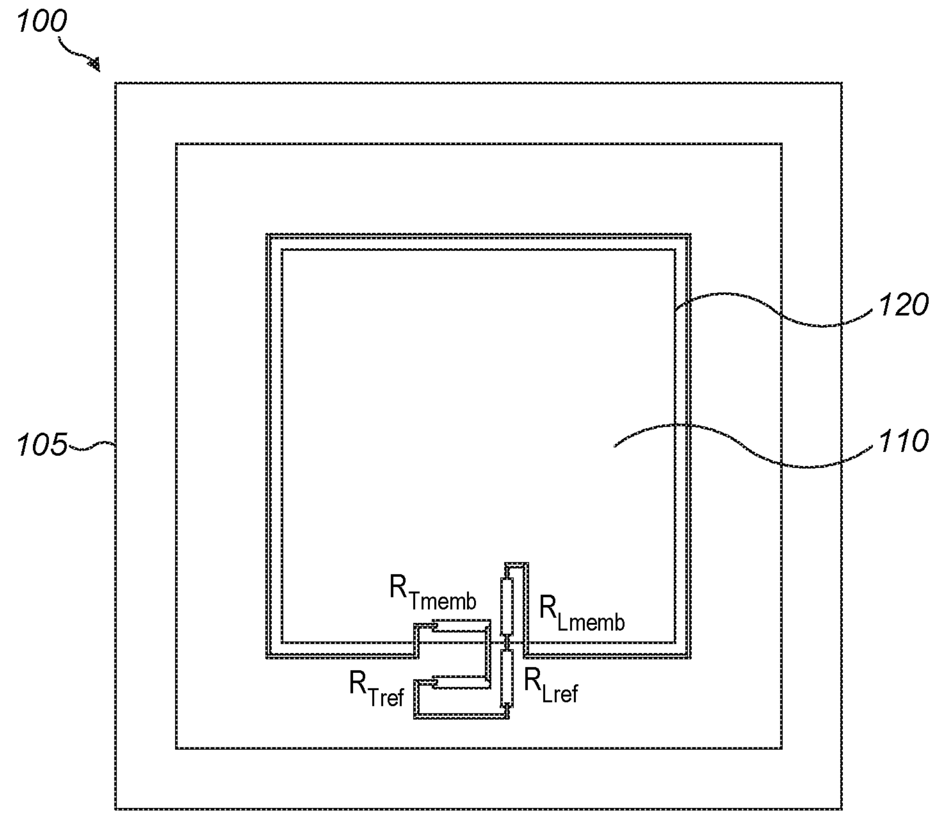
FIG. 5 shows a mirrored configuration of sensing piezo resistors on a membrane and compensating piezo resistors outside the membrane in accordance with embodiments of the present invention.

In embodiments of the present invention the first piezo resistor $R_{Tmemb}$ and the third piezo resistor $R_{Tref}$ are positioned symmetrically with respect to a first mirror line parallel with the edge of the membrane, and the second piezo resistor $R_{Lmemb}$ and the fourth piezo resistor $R_{Lref}$ are positioned symmetrically with respect to a second mirror line parallel with the edge of the membrane (orthogonal to the first mirror line). An example of such a layout is illustrated in FIG. 5. In this exemplary embodiment of the present invention the reference piezo resistors are at least partially outside the membrane. In an alternative layout the reference piezo resistors may be located at least partially in a zero stress zone of the membrane.

Figure 6:
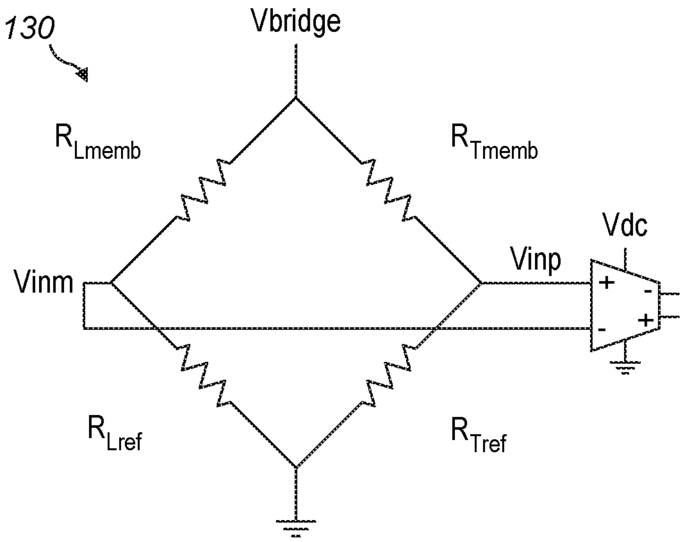
FIG. 6 shows a Wheatstone bridge configuration of a layout comprising sensing resistors and compensating resistors in accordance with embodiments of the present invention.

In embodiments of the present invention the piezo resistors are connected in a Wheatstone bridge configuration 130. An example thereof is shown in FIG. 6. In such a configuration a first supply node is formed by a connection between the first resistor ($R_{Tmemb}$) and the second resistor ($R_{Lmemb}$), a second supply node is formed by a connection between the third resistor ($R_{Tref}$) and the fourth resistor ($R_{Lref}$), a first output node is formed by a connection between the first resistor ($R_{Tmemb}$) and the third resistor ($R_{Tref}$), and a second output node is formed by a connection between the second resistor ($R_{Lmemb}$) and the fourth resistor ($R_{Lref}$). A supply voltage can be applied between the first supply node and the second supply node, and a pressure sensitive signal can be measured between the first and the second output node. It is an advantage of embodiments of the present invention that a signal from the first piezo resistor ($R_{Tmemb}$) and a signal from the second piezo resistor ($R_{Lmemb}$) can be corrected with a signal from the third piezo resistor ($R_{Tref}$) and a signal from the fourth piezo resistor ($R_{Lref}$), and a measure of the pressure on the membrane can be obtained by connecting piezo-resistors in a Wheatstone configuration.

The layout illustrated in FIG. 5 is particularly suitable for connecting the piezo resistors in a Wheatstone bride configuration because no metal line cross-overs are required for connecting the piezo resistors, for powering the resistor bridge and for reading out the output nodes of the output bridge. In a point-symmetric layout such as for example illustrated in FIG. 3 the Wheatstone bridge configuration is only possible with cross-overs of the metal lines or complicated wiring for connecting the piezo resistors, for powering the resistor bridge and for reading out the output nodes of the output bridge. The embodiment illustrated in FIG. 5 gives in a little bit on symmetry but allows a simple layout of a Wheatstone bridge. In embodiments of the present invention deviations from point symmetry have less impact than the asymmetry caused by cross-overs.

In embodiments of the present invention the voltage difference between the first output node and the second output node is used as the measure of the pressure on the membrane. In embodiments of the present invention the bridge voltage may change with the temperature. This is for example the case when the bridge is supplied with current. In such embodiments an average of a voltage across the output nodes may be used as a measure for temperature. In embodiments of the present invention the resistance of the piezo resistors may be used as a measure for temperature. When, for example, configured in a Wheatstone bridge, the total resistance may be used as a measure for temperature (no matter if it is supplied with a current or a voltage).

Figure 7:
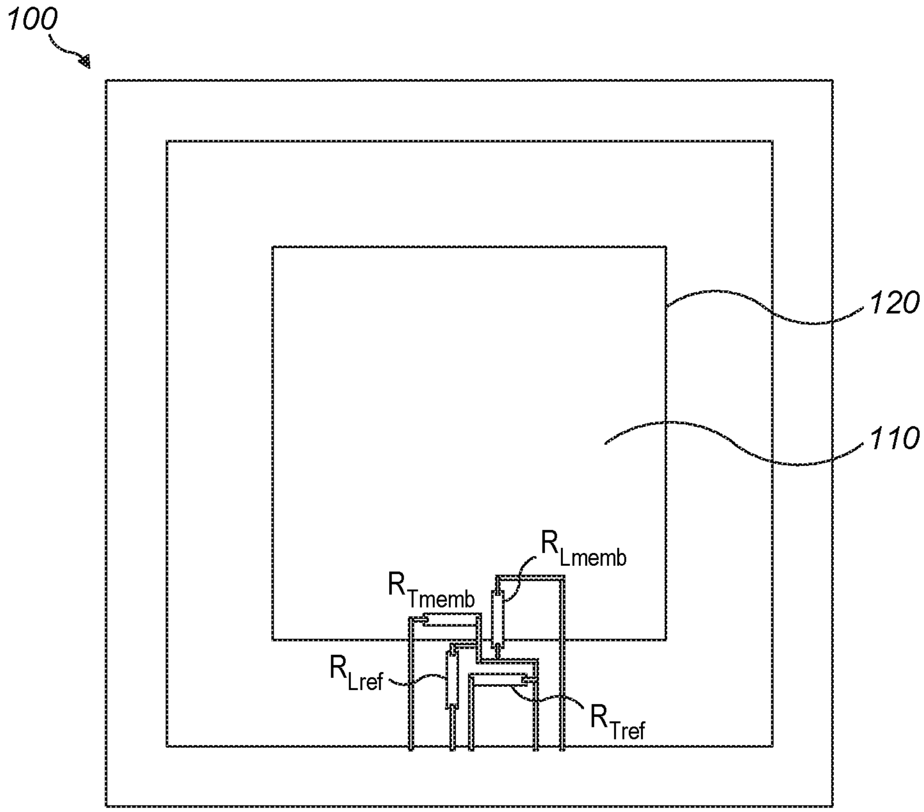
FIG. 7 shows a common node layout comprising sensing resistors and compensating resistors in accordance with embodiments of the present invention.
Figure 8:
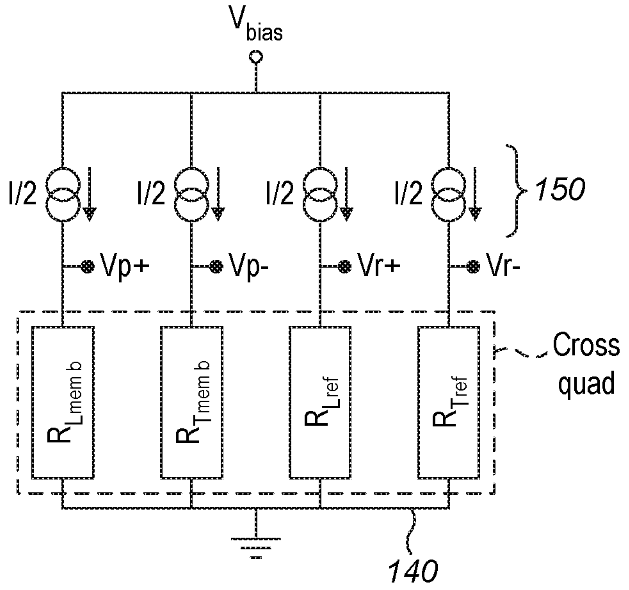
FIG. 8 shows an electronic scheme comprising piezo resistors in a common node configuration and a current source per piezo-resistor, in accordance with embodiments of the present invention.

In embodiments of the present invention the piezo resistors of a group of neighboring piezo resistors are connected to a common node. In embodiments of the present invention this common node may be connected to the substrate. In embodiments of the present invention the semiconductor pressure sensor is configured for applying, per piezo resistor, a predefined current through the piezo resistors. This predefined current may be the same for each piezo resistor. An example of such a common node configuration is shown in FIG. 7 and FIG. 8. One node of each piezo-resistor is connected to ground and the other is connected to a known current source separately for each piezo resistor. For this configuration there is only a need for 1 longitudinal and 1 transversal piezo resistor as pressure sensitive sensors and thus also only 2 compensation resistors. It is an advantage of the common node configuration that the sensitivity doesn't decrease by adding the compensation resistors which is the case for the single Wheatstone bridge with compensation resistors. Another advantage is that the four resistors can be placed in a point symmetric layout which optimizes the matching for temperature and stress gradients. Another advantage is that the current through the individual resistors can cause a voltage over the resistors which voltage is more than half the supply voltage. This also increases the sensitivity compared to Wheatstone bridges. Another advantage is that the resistors do not have to be powered all at the same time. Therefore the total power consumption of the four resistors supplied with currents can be less than the power consumption of a Wheatstone bridge. In FIG. 7 the compensating piezo resistors are outside the membrane. As explained earlier they may also be at least partially in a zero stress zone of the membrane.

In embodiments of the present invention the semiconductor pressure sensor is configured for applying, per piezo resistor, a predefined current through the piezo resistors. In embodiments of the present invention the predefined current is the same for each piezo resistor. Matching of current can be improved by using one current source and connect the individual resistors one after the other or in pairs to the current sources.

In embodiments of the present invention the common mode may be connected to the substrate. When the common node of the four resistors is connected to the substrate all bias voltages of the four resistors will be matched in a better way than for Wheatstone bridges and will have minimum leakage currents.

In the common node configuration the signals from the piezo resistors are voltages across the piezo resistors and the semiconductor pressure sensor is configured such that a signal from the first piezo resistor ($R_{Tmemb}$) and a signal from the second piezo resistor ($R_{Lmemb}$), corrected with a signal from the third piezo resistor ($R_{Tref}$) and a signal from the fourth piezo resistor ($R_{Lref}$), are used as a measure of a pressure on the membrane.

This may for example be achieved using the following equation:

$$I\cdot[R_{Lmemb}-R_{Tmemb}-(R_{Lref}-R_{Tref})]$$

In this equation I is the current through all resistors. In this way a positive output voltage is obtained when a pressure is applied from the top.

The difference in voltage may be detected at an analog input interface. With an analog to digital converter the signal may be converted into a digital number. Calibration of the sensor may be done in a digital way by using the ADC values for the voltage differences in a polynomial equation together with calibration constants. The invention is, however, not limited thereto. There are other ways possible, such as for example by modulating the currents through the resistors to control the voltage differences to zero.

An average of the voltage across the third piezo resistor ($R_{Lref}$) and the voltage across the fourth piezo resistor ($R_{Tref}$) may be used for obtaining the measure of temperature on the resistor combination. The difference between voltages across two piezo resistors may obtained by measuring a differential voltage across the two resistors.

Figure 9:
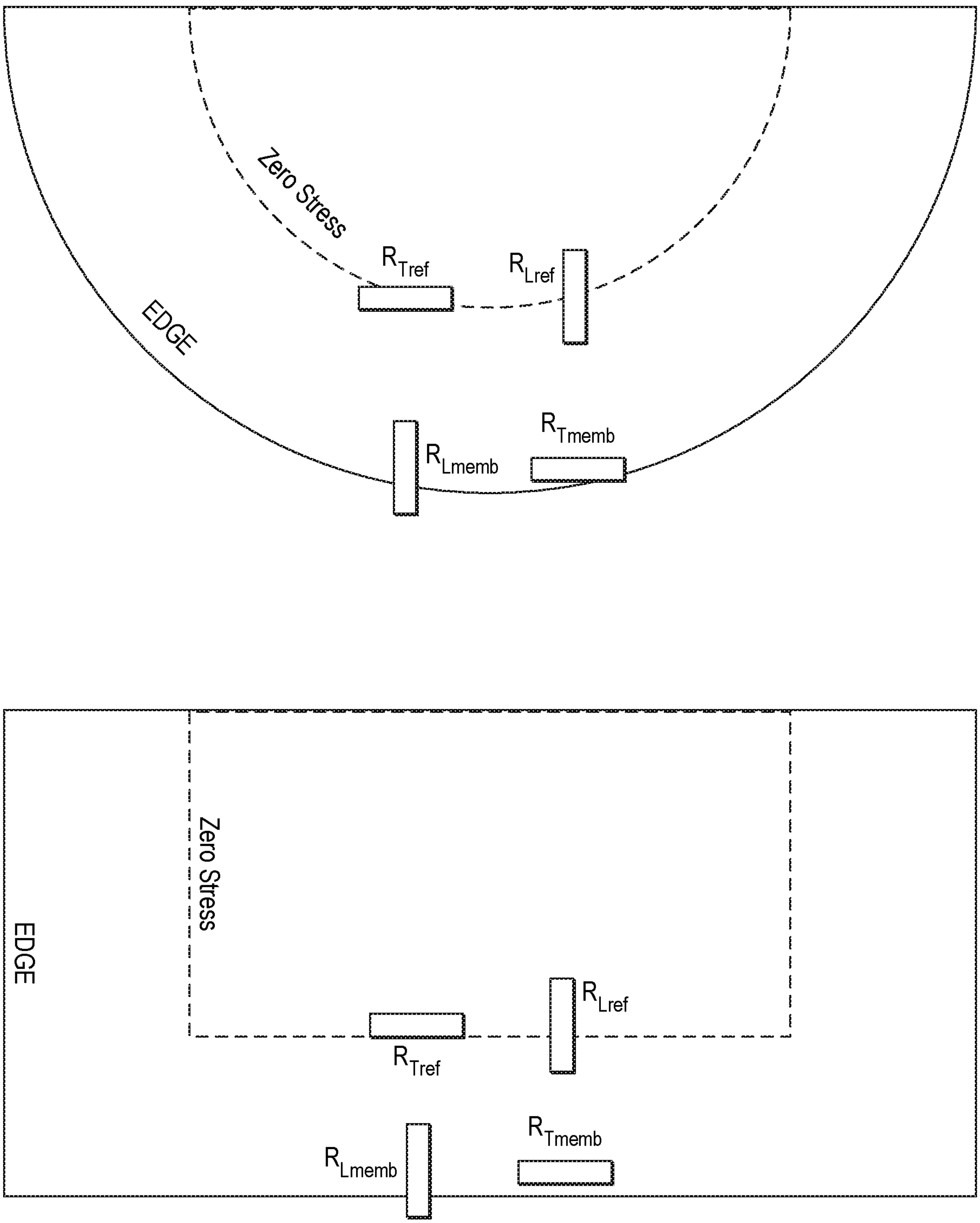
FIG. 9 shows half of a circular membrane and half of a square membrane comprising sensing piezo resistors and compensating piezo resistors in a point symmetric configuration wherein the compensating piezo resistors are at least partly located on a zero stress zone of the membrane, in accordance with embodiments of the present invention.
Figure 10:
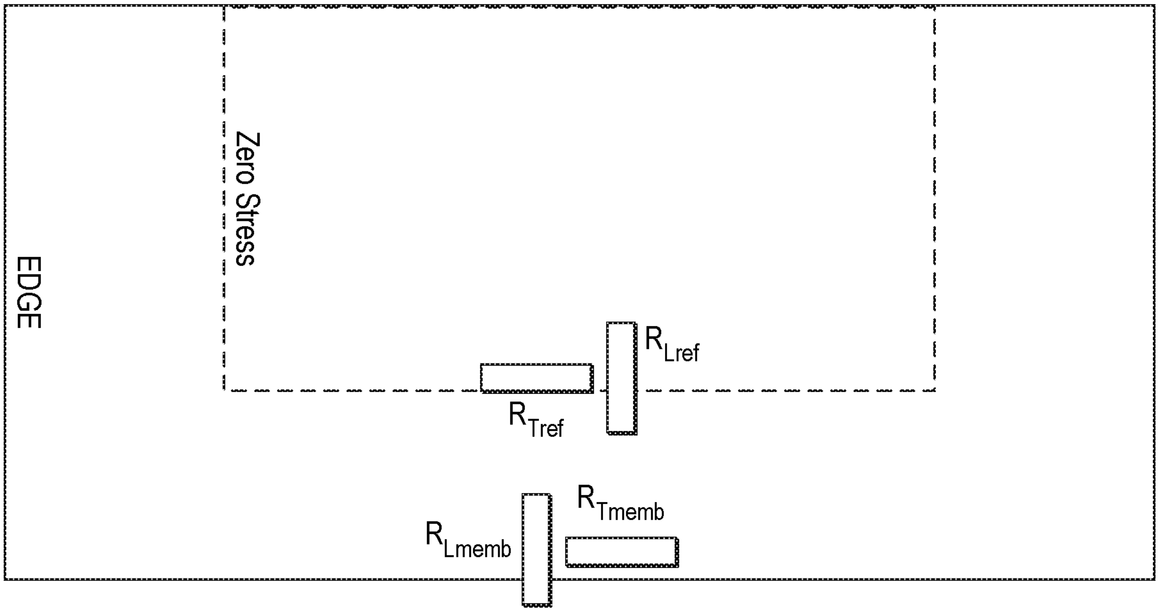
FIG. 10 shows half of a square membrane comprising sensing piezo resistors and compensating piezo resistors wherein the distance between the sensing piezo resistors and the distance between the compensating piezo resistors is closer than in FIG. 9.

In the common node configuration the semiconductor pressure sensor may comprise a current source 150 per piezo resistor wherein each current source is connected to a separate piezo resistor. In an alternative configuration the semiconductor pressure sensor comprises a current source and the semiconductor pressure sensor is configured for switching the current source between at least some of the piezo resistors. In some embodiments the semiconductor pressure sensor comprises a single current source and the semiconductor pressure sensor is configured for switching the current source between all the piezo resistors An exemplary embodiment where the piezo resistors are positioned on a circular membrane is shown in the top drawing of FIG. 9 and on a square membrane is shown in the bottom drawing of FIG. 9. For both examples only the lower half of the membrane is depicted. The size of the membrane in this example was 1000 μm. This is considered a large membrane. It is understood that the membrane may also have different sizes. The compensating piezo resistors are in both designs at least partially positioned on a zero stress zone and the sensing piezo resistors are positioned on the membrane at a side of the membrane. The compensation and the sensing piezo-resistors are positioned in a point symmetric combination. In FIG. 10 a similar configuration is shown as in FIG. 9. In FIG. 10 the distance between the reference resistors is smaller than in FIG. 9 and the distance between the sensing resistors is smaller than in FIG. 9. In both point symmetric layouts the distance between the middle of $R_{Lref}$ and $R_{Lmemb}$ is the same as between $R_{Tref}$ and $R_{Tmemb}$ and when the layout is turned 180° around the center point the same layout is obtained. It can be seen that in a point symmetric configuration the midpoints of the piezo resistors may form a rectangle and that they not strictly have to form a square.

When a stress is applied on a piezo resistor in the same direction as the current this will change the resistance differently than when a stress is applied that is perpendicular on the current of the piezo-resistor.

A piezo resistor will also change with temperature, and hence also when a temperature gradient is present over the semiconductor pressure sensor.

In embodiments of the present invention the semiconductor is configured for comparing the signal of the first piezo resistor $R_{Tmemb}$ with the signal from the second piezo resistor $R_{Lmemb}$ for determining correct functionality of the semiconductor pressure sensor. As both are sensitive to the differential pressure on the membrane, their signals should be correlated. If not, a malfunction of the semiconductor pressure sensor can be assumed. The semiconductor pressure sensor may comprise a processing device for processing these signals. In embodiments of the present invention comparison of the signal of the first piezo resistor $R_{Tmemb}$ with the signal from the second piezo resistor $R_{Lmemb}$ may be done after correction of these signals with the signals from the third and the fourth piezo resistor.

The changes of the four resistor combinations (FIG. 3 and FIG. 4) due to pressure SP, temperature and assembly stress SA can be described as explained in the following paragraphs.

$R_{Tmemb}$ and $R_{Lmemb}$ see the stress from the pressure SP, and as a result induce the following signals:

$$R_{Lmemb}\text{: } SP_L \text{ (longitudinal) and}$$

$$R_{Tmemb}\text{: } SP_T \text{ (transversal)}$$

$R_{Lmemb}$ and $R_{Lref}$ see the stress from assembly SA in x (horizontal direction) and y (vertical direction), and as a result induce the following signals:

$$R_{Lmemb}\text{: } SAL_y + SAT_x = A$$

$$R_{Lref}\text{: } SAL_y + SAT_x$$

$R_{Tmemb}$ and $R_{Tref}$ see the stress from assembly SA in x and y, and as a result induce the following signals:

$$R_{Tmemb}\text{: } SAL_x + SAT_y = B$$

$$R_{Tref}\text{: } SAL_x + SAT_y$$

The combined signals per piezo resistor are then as follows:

$$R_{Lmemb}\text{: } R_0\,(1 + SP_L + SAL_y + SAT_x) = R_0\,(A + SP_L)$$

$$R_{Tref}\text{: } R_0\,(1 + SAL_x + SAT_y) = R_0\,B$$

$$R_{Tmemb}\text{: } R_0\,(1 + SP_T + SAL_x + SAT_y) = R_0\,(B + SP_T)$$

$$R_{Lref}\text{: } R_0\,(1 + SAL_y + SAT_x) = R_0\,A$$

In these equations $R_0$ is the nominal resistance in case of no stress from the assembly and no pressure difference over the membrane. In embodiments of the present invention, where the individual piezo resistors are matched from a layout and process perspective, $R_0$ is considered the same for all piezo resistors. By providing neighboring piezo resistors an optimal matching can be achieved.

In these equations A and B may for example be close to one. A for example, increases above 1 for stress perpendicular to the membrane and decreases below 1 for stress parallel to the membrane. B decreases below 1 for stress perpendicular to the membrane and increases above 1 for stress parallel to the membrane. $SP_L$ may for example be about 4% and $SP_T$ almost −4% for a full scale pressure signal.

With the 4 current sources and the common node configuration (see FIG. 7 and FIG. 8) the following signal can be obtained using a separate circuit:

$$R_{Lmemb} - R_{Tmemb} - (R_{Lref} - R_{Tref}) = R_{Lmemb} - R_{Tmemb} - R_{Lref} + R_{Tref}$$

That gives then the following output of the separate circuit:

$$V_{out}/I = R_o(A + S_{PL}) - R_o(B + S_{PT}) - R_oA + R_oB = R_o(S_{PL} - S_{PT})$$

$$V_{out}/IR_o = S_{PL} - S_{PT}$$

In this configuration all assembly stress components, A and B, drop out, and there is assembly stress compensation for offset and sensitivity.

For the configuration in FIG. 5 and FIG. 6 the output voltage can be written:

$$\frac{V_{inp} - V_{inm}}{V_{bridge}} = \frac{R_{Tref}}{R_{Tref} + R_{Tmemb}} - \frac{R_{Lref}}{R_{Lref} + R_{Lmemb}} = \frac{B}{2B + SP_T} - \frac{A}{2A + SP_L} = \frac{1}{2 + SP_T/B} - \frac{1}{2 + SP_L/A}$$

For this configuration the offset is perfectly compensated for package stress. Also the dependency of the sensitivity on the package stress is reduced. It can still change, however, only as a second order effect, as A and B change in opposite direction for assembly stress in x and y as $SP_T$ and $SP_L$ have opposite signs.

In the equations above no stress gradients are introduced. This is done in the equations below. The influence of stress is typically not the same for two longitudinal resistors compared to two transversal resistors.

The equations can then be rewritten as follows:

$$RLsens: Ro(1 + SPL + SALy + SATx) = Ro(A + SPL)$$

$$Rlref: Ro(1 + SALy + SATx) = Ro\,A*$$

$$Rtsens: Ro(1 + SPT + SALx + SATy) = Ro(B + SPT)$$

$$RTref: Ro(1 + SALx + SATy) = Ro\,B*$$

In these equations A, A, B and B* are close to one. A and A* increase above 1 for stress perpendicular to the membrane and decrease below 1 for stress parallel to the membrane.

B and B* decrease below 1 for stress perpendicular to the membrane and increase above 1 for stress parallel to the membrane.

For the common mode configuration illustrated in FIG. 7 and FIG. 8 this may result in the following output signal (depending on the processing another signal may be derived therefrom).

$$\frac{V_{out}}{I R_o} = (A + SP_L) - (B + SP_T) - A^* + B^*$$

$$\frac{V_{out}}{I R_o} = (SP_L - SP_T) + A - A^* + B^* - B$$

The sensitivity is not affected by the terms A, A, B and B* and therefore not package stress dependent. It can be analysed that offset is compensated for assembly stress gradients parallel to the membrane edge, but not for assembly stress gradients perpendicular to the membrane edge.

Where in embodiments of the present invention reference is made to a modified Wheatstone bridge configuration, reference is made to a configuration wherein an output node connects to parallel piezo resistors. In a standard Wheatstone bridge configuration, on the other hand, an output node connects two orthogonally oriented piezo resistors. A modified Wheatstone bridge configuration may be used for connecting piezo-resistors which ore organized in a point symmetric layout. An example thereof is shown in FIG. 5.

For the modified Wheatstone bridge configuration with an edge symmetric layout as shown in FIG. 5. the following equations can be derived:

$$\frac{V_{inp} - V_{inm}}{V_{bridge}} = \frac{R_{Tref}}{R_{Tref} + R_{Tsense}} - \frac{R_{Lref}}{R_{Lref} + R_{Lsense}}$$

$$\frac{V_{inp} - V_{inm}}{V_{bridge}} = \frac{B^*}{B + B^* + SP_T} - \frac{A^*}{A + A^* + SP_L}$$

$$\frac{V_{inp} - V_{inm}}{V_{bridge}} = \frac{1}{1 + B/B^* + SP_T/B^*} - \frac{1}{1 + A/A^* + SP_L/A^*}$$

In this example the sensitivity is affected by package stress. It can be analysed that the offset only depends on the assembly stress for stress gradients perpendicular to the membrane edge and that for gradients parallel to the edge the offset compensation for assembly stress is complete. Note that the sensitivity is only half of that of a normal Wheatstone bridge and the sensitivity of the common node configuration can be larger than that of a normal Wheatstone bridge. Therefore the stress gradient dependence perpendicular to the membrane edge has a larger effect on the modified Wheatstone bridge than for the common node configuration.

In embodiments of the present invention the semiconductor pressure sensor should be configured such that a signal from the first piezo resistor ($R_{Tmemb}$) and a signal from the second piezo resistor ($R_{Lmemb}$), corrected with a signal from the third piezo resistor ($R_{Tref}$) and a signal from the fourth piezo resistor ($R_{Lref}$), are used as a measure of a pressure on the membrane. This is achieved using the configurations which are explained above. It may also be achieved using a modified Wheatstone bridge configuration.

Figure 11:
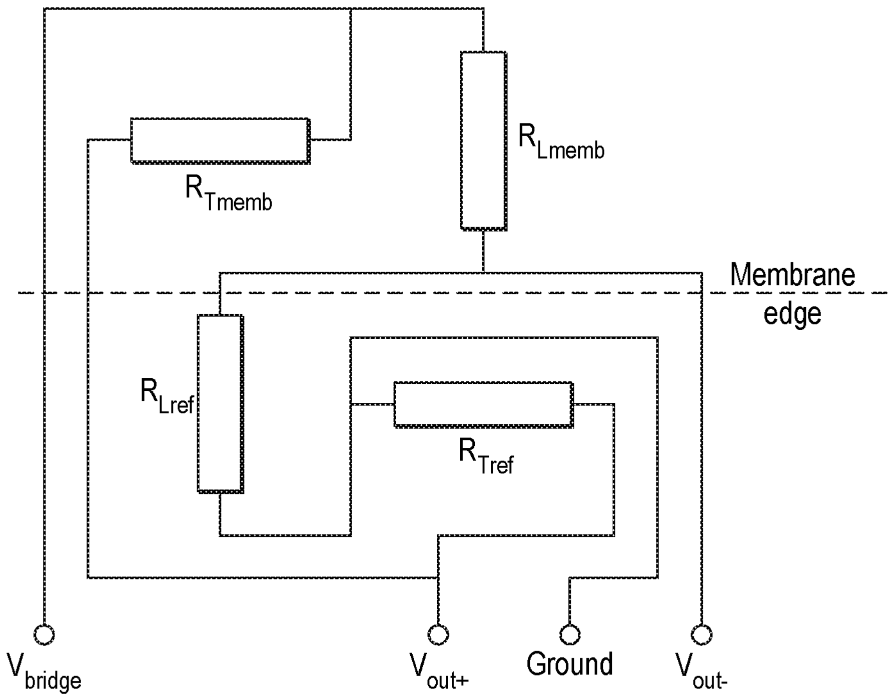
FIG. 11 shows a modified Wheatstone bridge configuration, for piezo-resistors which are positioned in a point symmetric layout, of a semiconductor pressure sensor in accordance with embodiments of the present invention.

FIG. 11 shows an example of a modified Wheatstone bridge configuration without cross overs. In this configuration a first terminal of the first piezo resistor ($R_{Tmemb}$) and a first terminal of the second piezo resistor ($R_{Lmemb}$) are connected together and are used for biasing the circuit. The second terminal of the first piezo resistor ($R_{Tmemb}$) is connected with a first terminal of the third piezo resistor ($R_{Tref}$) and is used as one of the output nodes ($V_{out+}$) The second terminal of the second piezo resistor ($R_{Lmemb}$) is connected with a first terminal of the fourth piezo resistor ($R_{Lref}$) and is used as one of the output nodes ($V_{out-}$). The second terminal of the fourth piezo resistor ($R_{Lref}$) is connected with the second terminal of the third piezo resistor ($R_{Tref}$) and is used as ground. The bias voltage (Vbridge) is applied between the first terminal of the first piezo resistor and the ground. In embodiments of the present invention the first terminal of the first piezo resistor ($R_{Tmemb}$) can be connected with the substrate.

For modified Wheatstone bridge configuration the same equations hold as for the Wheatstone bridge configuration with an edge symmetric layout. It can be seen that the sensitivity is affected by package stress. It can be analysed that the offset only depends on the assembly stress for stress gradients perpendicular to the membrane edge. Note that the sensitivity is only half of that of a normal Wheatstone bridge and the sensitivity of the common node configuration can be larger than that of a normal Wheatstone bridge. Therefore, the stress gradient dependence has a larger effect on the modified Wheatstone bridge than for the common node configuration.

From these analyses it can be concluded that a point symmetric modified Wheatstone bridge configuration suppresses the influence of the assembly stress on the offset, that an edge symmetric modified Wheatstone bridge suppresses the influence of the assembly stress on the offset and suppresses assembly stress gradients parallel to the membrane edge. The common mode configuration suppresses assembly stress for the sensitivity, and for the offset and has a sensitivity which is twice the sensitivity than for a Wheatstone bridge.

In embodiments of the present invention the piezo resistors may be single strip piezo resistors. The invention is, however, not limited thereto. Also multi-strip piezo resistors are possible.

The invention claimed is:

1. A semiconductor pressure sensor in a substrate, the semiconductor pressure sensor comprising a membrane, delineated by an edge, and a group of neighboring piezo resistors, the group comprising:

a first pair of piezo resistors, comprising a first piezo resistor ($R_{Tmemb}$) and a second piezo resistor ($R_{Lmemb}$) near the edge of the membrane, and positioned such that center points of the first pair of piezo resistors are located on the membrane, a second pair of piezo resistors, comprising a third piezo resistor ($R_{Tref}$) and a fourth piezo resistor ($R_{Lref}$) at a position where applied pressure causes reduced surface stress compared to surface stress at the position of the first and the second piezo resistor wherein the first and the third piezo resistor ($R_{Tmemb}$ and $R_{Tref}$) are substantially orthogonal to the second and the fourth piezo resistor ($R_{Lmemb}$ and $R_{Lref}$), wherein the semiconductor pressure sensor is configured such that a signal from the first piezo resistor ($R_{Tmemb}$) and a signal from the second piezo resistor ($R_{Lmemb}$), corrected with a signal from the third piezo resistor ($R_{Tref}$) and a signal from the fourth piezo resistor ($R_{Lref}$), are used as a measure of a pressure on the membrane, wherein the piezo resistors form a Wheatsone bridge wherein:

a first supply node is formed by a connection between the first piezo resistor ($R_{Tmemb}$) and the second piezo resistor ($R_{Lmemb}$), a second supply node is formed by a connection between the third piezo resistor ($R_{Tref}$) and the fourth piezo resistor ($R_{Lref}$), a first output node is formed by a connection between the first piezo resistor ($R_{Tmemb}$) and the third piezo resistor ($R_{Tref}$), a second output node is formed by a connection between the second piezo resistor ($R_{Lmemb}$) and the fourth piezo resistor ($R_{Lref}$).

2. The semiconductor pressure according to claim 1, wherein the four piezo resistors form a point symmetric layout.

3. The semiconductor pressure sensor according to claim 1, wherein the first piezo resistor ($R_{Tmemb}$) and the third piezo resistor ($R_{Tref}$) are positioned symmetrically with respect to a mirror line parallel with the edge of the membrane, and wherein the second piezo resistor ($R_{Lmemb}$) and the fourth piezo resistor ($R_{Lref}$) are positioned symmetrically with respect to a mirror line parallel with the edge of the membrane.

4. The semiconductor sensor according to claim 1, wherein a voltage difference between the first output node and the second output node is used as the measure of the pressure on the membrane.

5. The semiconductor pressure sensor according to claim 1, wherein the neighboring piezo resistors are present in a quarter of the membrane.

6. The semiconductor pressure sensor according to claim 1, wherein the semiconductor is configured for comparing the signal of at least two piezo resistors for determining correct functionality of the semiconductor pressure sensor.

* * * * *